United States Patent
Chakraborty et al.

(10) Patent No.: US 7,117,216 B2
(45) Date of Patent: Oct. 3, 2006

(54) METHOD AND APPARATUS FOR RUNTIME MERGING OF HIERARCHICAL TREES

(75) Inventors: Krishnendu Chakraborty, San Mateo, CA (US); Amy M. Wong, Fremont, CA (US); Joerg Heilig, Hamburg (DE)

(73) Assignee: Sun Microsystems, Inc., Palo Alto, CA (US)

( * ) Notice: Subject to any disclaimer, the term of this patent is extended or adjusted under 35 U.S.C. 154(b) by 212 days.

(21) Appl. No.: 10/038,203

(22) Filed: Oct. 19, 2001

(65) Prior Publication Data

US 2002/0188613 A1 Dec. 12, 2002

Related U.S. Application Data

(60) Provisional application No. 60/296,814, filed on Jun. 7, 2001.

(51) Int. Cl.
*G06F 17/30* (2006.01)
*G06F 15/16* (2006.01)

(52) U.S. Cl. .................. 707/100; 707/102; 709/242

(58) Field of Classification Search .............. 707/1, 707/3, 5, 7, 10, 102, 500, 100, 104.1, 6, 513; 717/140; 715/500; 709/242
See application file for complete search history.

(56) References Cited

U.S. PATENT DOCUMENTS

| | | | | |
|---|---|---|---|---|
| 3,662,400 A | * | 5/1972 | Geil | 707/1 |
| 4,466,060 A | * | 8/1984 | Riddle | 709/242 |
| 5,495,479 A | * | 2/1996 | Galaand et al. | 370/404 |
| 5,970,490 A | * | 10/1999 | Morgenstern | 707/10 |
| 6,094,664 A | * | 7/2000 | Ungar | 707/206 |
| 6,208,997 B1 | * | 3/2001 | Sigeti et al. | 707/104.1 |
| 6,470,344 B1 | * | 10/2002 | Kothuri et al. | 707/100 |
| 2002/0023113 A1 | * | 2/2002 | Hsing et al. | 707/513 |
| 2002/0083073 A1 | * | 6/2002 | Vaidya et al. | 707/102 |
| 2002/0178437 A1 | * | 11/2002 | Blais et al. | 717/140 |
| 2003/0055850 A1 | * | 3/2003 | Larsen | 707/500 |
| 2003/0061191 A1 | * | 3/2003 | Pearson | 707/1 |

* cited by examiner

*Primary Examiner*—Jeffrey Gaffin
*Assistant Examiner*—Hassan Mahmoudi
(74) *Attorney, Agent, or Firm*—Sonnenschein Nath Rosenthal LLP

(57) ABSTRACT

Embodiments of the present invention relate to a method and apparatus for a runtime merging system of hierarchical trees with a reference node implementation. According to one or more embodiments of the present invention, a reference node is implemented which holds a reference to a node in a DOM tree active in memory. The reference node class allows adding nodes to the merged tree without having to make a clone of the node, which is an expensive operation. In one embodiment, if a particular node is not present below a certain level of the tree in any layer except a unique layer, it renders visiting the children of that node unnecessary. A reference is kept to the node in the memory.

33 Claims, 7 Drawing Sheets

1. Reference Node A~ Keeps a Reference to A
2. Any Children of A Are Also Included in the Contents of A~

All Nodes With Italics And Underscore Are Reference Nodes

Merged Tree

METHOD AND APPARATUS FOR RUNTIME MERGING OF HIERARCHICAL TREES

RELATED APPLICATION

This application claims the benefit of U.S. Provisional Patent Application No. 60/296,814 filed Jun. 7, 2001, the disclosure of which is hereby incorporated by reference.

BACKGROUND OF THE INVENTION

1. Field of the Invention

The present invention relates to a method and apparatus of runtime merging of hierarchical trees.

2. Background Art

The Internet has made it possible for computer users to access to their applications, files, and data from any web-enabled device. The applications, files, and data are usually stored on a server and are typically organized in a hierarchical manner. There are preferences associated with each layer in the hierarchy so that each user has a unique presentation of the applications, files and data. The hierarchy is normally stored using a document object model (DOM) and might access data in an extensible markup language (XML) format.

When multiple preferences exist in the hierarchy, the system must choose between equivalent nodes in multiple trees, so that the preference that takes precedence is chosen in a final "merge tree". To do so, however, is an expensive process as will be further explained below. Before discussing this problem, an overview is provided.

Internet

The Internet is a network connecting many computer networks and is based on a common addressing system and communications protocol called TCP/IP (Transmission Control Protocol/Internet Protocol). From its creation it grew rapidly beyond its largely academic origin into an increasingly commercial and popular medium. By the mid-1990s the Internet connected millions of computers throughout the world. Many commercial computer network and data services also provided at least indirect connection to the Internet.

The original uses of the Internet were electronic mail (e-mail), file transfers (ftp or file transfer protocol), bulletin boards and newsgroups, and remote computer access (telnet). The World Wide Web (web), which enables simple and intuitive navigation of Internet sites through a graphical interface, expanded dramatically during the 1990s to become the most important component of the Internet. The web gives users access to a vast array of documents that are connected to each other by means of links, which are electronic connections that link related pieces of information in order to allow a user easy access to them. Hypertext allows the user to select a word from text and thereby access other documents that contain additional information pertaining to that word; hypermedia documents feature links to images, sounds, animations, and movies.

The web operates within the Internet's basic client-server format. Servers are computer programs that store and transmit documents (i.e., web pages) to other computers on the network when asked to, while clients are programs that request documents from a server as the user asks for them. Browser software allows users to view the retrieved documents. A web page with its corresponding text and hyperlinks is normally written in HTML or XML and is assigned an online address called a Uniform Resource Locator (URL).

XML DOM

XML is emerging as the next generation of markup languages. XML DOM details the characteristic properties of each element of a web page, thereby detailing how one might manipulate these components and, in turn, manipulate the page. Each component is stored in memory. Components include for instance, objects, properties, methods, and events. An object is a container which reflects a particular element of a page. Objects contain the various characteristics which apply to that element (known as properties and methods). For example, the submit object contains properties and methods relevant to the submit button in a form.

Properties are characteristics of an object; for example, the document object possesses a bgColor property which reflects the background color of the page. Using a programming language (e.g., JavaScript) one may, via this property, read or modify the color of the current page. Some objects contain very many properties, some contain very few. Some properties are read-only, while others can be modified, possibly resulting in immediate on-screen results.

A method typically executes an action which somehow acts upon the object by which it is owned. Sometimes the method also returns a result value. Methods are triggered by the programming language being used, such as JavaScript. For example, the window object possesses a method named alert ( ). When supplied with string data, the alert ( ) method causes a window to pop up on the screen containing the data as its message; (e.g., alert("Invalid entry!")).

An event is used to trap actions related to its owning object. Typically, these actions are caused by the user. For example, when the user clicks on a submit button, this is a click event which occurs at the submit object. By virtue of submitting a form, a submit event is also generated, following the click event. Although these events occur transparently, one can choose to intercept them and trigger specified program code to execute.

Preferences

Using a web-enabled device to access data, files, and applications over the Internet significantly reduces issues associated with installation, configuration, maintenance, upgrades for end users and information technology (IT) departments. Furthermore, it eliminates license fees and lowers the total cost of ownership for enterprise and service providers. Enterprises are generally hierarchical in nature. Application and user preferences stored for each user running desktop applications are mostly collected from more than one layer.

For example, an organization can have users belonging to a group. Any preference data that is absent in the user layer can be picked up from the group layer. Groups can have system-wide global administrators that can dictate enterprise level policies. Layering data in IT organization provides a hierarchical structure to data and decreases redundancy in data storage. Imagine a specific preference data for 100 users belonging to the same group being the same for all users (i.e., department name); the deployment environment is left with two choices; one, replicate the same information for all users, or two, keep the specific preference data in the group layer and merge the information at runtime with the user's preference data during the extraction of the information from a backend data store.

In the prior art, the second alternative is picked more frequently than the first one. For systems where the backend data store for configuration data is XML stored in flat files, this data is fetched through a configuration server which helps the user to read, edit and delete application data through a pure application program interface (API) that is platform independent, such as the Java API. A call to read preference data is translated to the correct set of XML files from the required layers and the data is merged at runtime to create the resultant data for the end client application. Often, the task of merging is left to the configuration server that uses pure DOM API to read XML from all the required layers and merge them into a temporary DOM tree that is written back to a socket stream.

Problems Associated with Merging DOM Trees on the Fly

Though the DOM API is simple and easy to use, it comes with the price of memory allocations that are proportionate to the size of data (e.g., XML data) and the depth of nesting. In general, tree traversals are expensive and it is wise to complete the decision of choosing the right information while traversing the tree for the first time. The difficulty in traversing unbalanced trees is due to the fact that leaf nodes present at a particular depth in one tree may not be present in the other trees that need to be traversed. XML DOM exacerbates the problem by not allowing data in a DOM tree to be manipulated without copying the node. Merging data from various layers involves two major traversals:

1. The first traversal should traverse all the XML trees from the various layers to find the winning nodes (nodes that should be present in the merged tree). This can be done by copying the data to a temporary tree through the use of the cloneNode( ) method from the DOM API.
2. Writing the temporary tree to the output stream used by a TCP socket that transports the data to the client.

Unfortunately, cloneNode( ) is the most expensive call in an XML parser. It has a list of drawbacks that makes it very unpopular to XML users:

1. The call is recursive and so it takes a lot of stack space depending on the depth and size of the XML node that is cloned. It also allocates internal data structures that help build the cloned node that are not freed until the call is complete.
2. Cloning large trees can prove to be very expensive specifically when it is used frequently in a multi-threaded environment.
3. Cloning creates a second copy of the data. If the data is merely meant for reading, creating a copy of the same data does not provide any advantage. In fact, it is disadvantageous because it takes more memory and CPU cycles from the machine.
4. The call to cloneNode( ) is typically used often.

SUMMARY OF THE INVENTION

Embodiments of the present invention relate to a runtime merge system with a reference node implementation. According to one or more embodiments of the present invention, a reference node is implemented which holds a reference to a node in a DOM tree active in memory. A reference node class is implemented in one embodiment, which allows adding nodes to the merged tree without having to make a clone of the node, which is an expensive operation.

In one embodiment, if a particular node is not present below a certain level of the tree in any layer except a unique layer, it renders visiting the children of that node unnecessary. In a typical scenario, the user tree may not have any information about a component (Office, for instance). Without a reference node, one had to visit every node in the "Office" component to make a copy of the data. With the use of reference nodes, the invention neither traverses the children of such a node, nor copies any of its contents to a new node. A reference is simply kept to the node in the memory and later this reference is used to print the data to a stream.

BRIEF DESCRIPTION OF THE DRAWINGS

These and other features, aspects and advantages of the present invention will become better understood with regard to the following description, appended claims and accompanying drawings where:

DETAILED DESCRIPTION OF THE INVENTION

The present invention relates to a method and apparatus for runtime merging of hierarchical trees. In the following description, numerous specific details are set forth to provide a more thorough description of embodiments of the invention. It will be apparent, however, to one skilled in the art, that the invention maybe practiced without these specific details. In other instances, well known features have not been described in detail so as not to obscure the invention.

Runtime Merge System

In one embodiment, a merge system is implemented which traverses DOM trees only once to decide on the winning nodes for the merged XML data (i.e., which preference takes precedence). Moreover, the system eliminates the use of cloneNode( ) from the whole infrastructure by defining a new concept of "Reference node." A reference node is a node that keeps a reference or pointer to the location of the XML node rather than a copy of the node. The result is a very fast and efficient merging system with minimal allocation of memory.

A merged tree refers to the merging of layers of XML node data, where the node chosen to be included in the merged tree is determined by the highest priority layer. For instance, assume that the merged data for the user preference came from three layers of data: System, Group, and User; in the order of increasing priority. The User layer has the highest priority, followed by Group and then System. Equivalent nodes in each tree are compared. The node in the layer of highest priority, among the layers represented, is added to the merged tree. Once all the nodes have been compared, the decision to add which node in the merged tree (which we refer to as the winning node) is complete.

Figure 1:
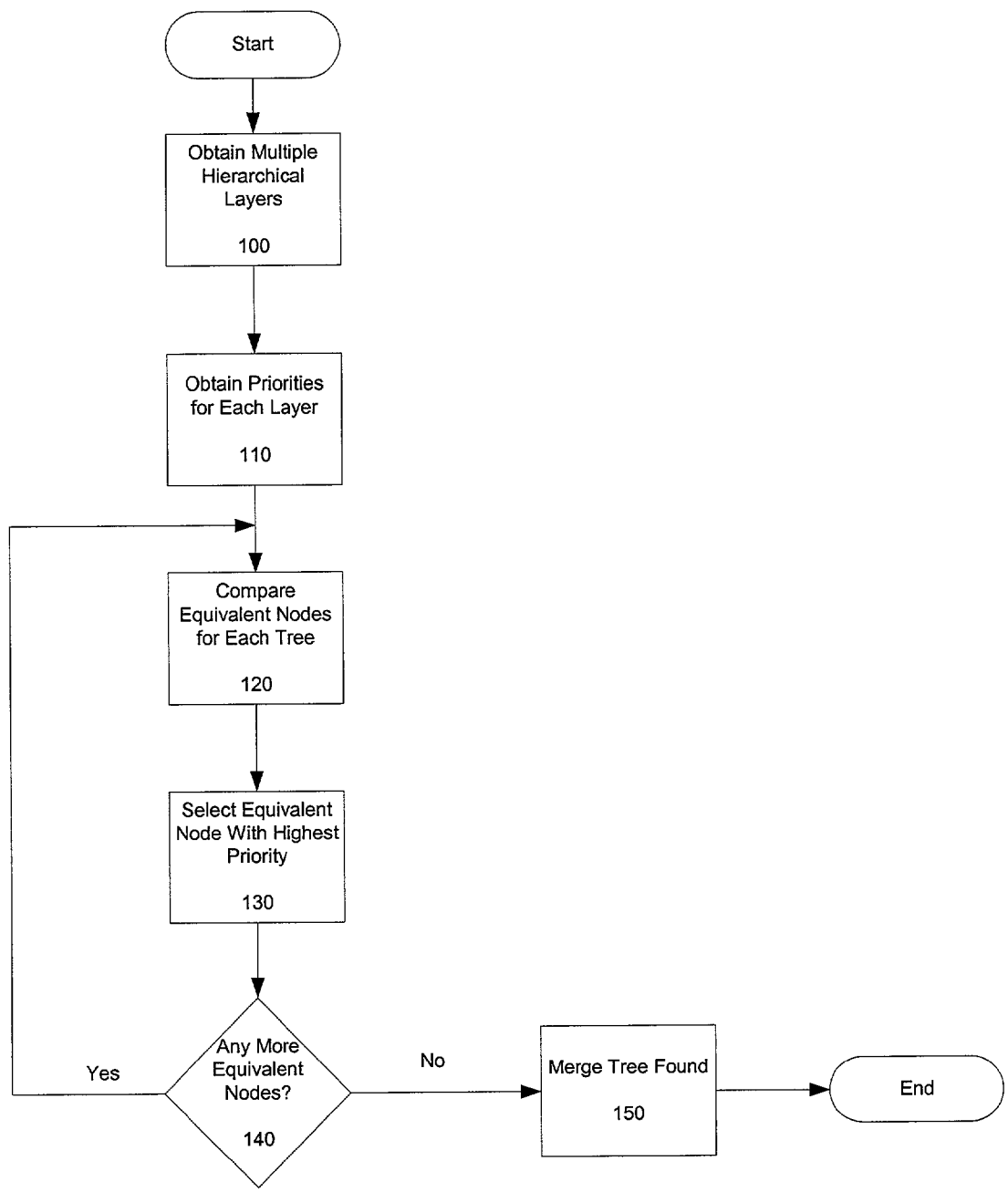
FIG. 1 shows how merge trees are created by one embodiment of the present invention.

FIG. 1 shows one embodiment of this process. At box 100, multiple hierarchical layers are obtained (i.e., user, group, and system). At box 110, priorities for each layer are obtained. At box 120, equivalent nodes for each tree are compared. At box 130, the equivalent node with the highest priority is selected to be added to the merged tree. At box 140, it is determined if there are anymore equivalent nodes. If not, the process is complete and the merged tree is created at box 150. Otherwise, the process repeats at box 120.

Reference Node Implementation

Unlike prior art methods that stored the entire fragment of a DOM tree inside memory, embodiments of the present invention use a reference node that holds a reference to a node in a XML DOM tree active in memory. The reference may be a Java reference, a pointer, or other suitable reference to a fragment of an XML DOM tree held in an application cache. A reference node class allows the adding of nodes to the merged tree without having to make a clone of the node. This class helps us to eliminate cloning nodes, which is an expensive operation. The concept of reference node is simple, yet very powerful. It not only saves copying data, but also avoids visiting every child of a node while building the merged tree.

If a particular node is not present below a certain level of the tree in any layer except a unique layer, it renders visiting the children of that node unnecessary. In a typical scenario, the user tree may not have any information about a component (Office, for instance). Before the introduction of the concept of reference node, one had to visit every node in the "Office" component to make a copy of the data. With the use of reference nodes, the invention neither traverses the children of such a node, nor copies any of its contents to a new node. A reference to the node is simply kept in the memory.

In one embodiment, the reference node is a class (defined in Java) similar to classes found in other high level programming languages like C++ that have data members and member functions. The reference node class of the present invention contains an elementNode data member, and a few member functions which include Set (to create a new reference node), Get (to fetch a reference node), Name (to obtain the name of a reference node), and WritetoXML (to write a reference node to its tree, for example, in the form of I/O, disk, or stream on cache). This makes the reference node use minimal memory.

The elementNode data member extends the XML public class Node, and is hence a standard elementNode found throughout the current computing environment, especially the World Wide Web environment. The reason for having a standard elementNode member is that if in the future a fragment from a different DOM partner needs, for example, to be merged, then the definition of an elementNode of the present invention will work properly.

Figure 2:
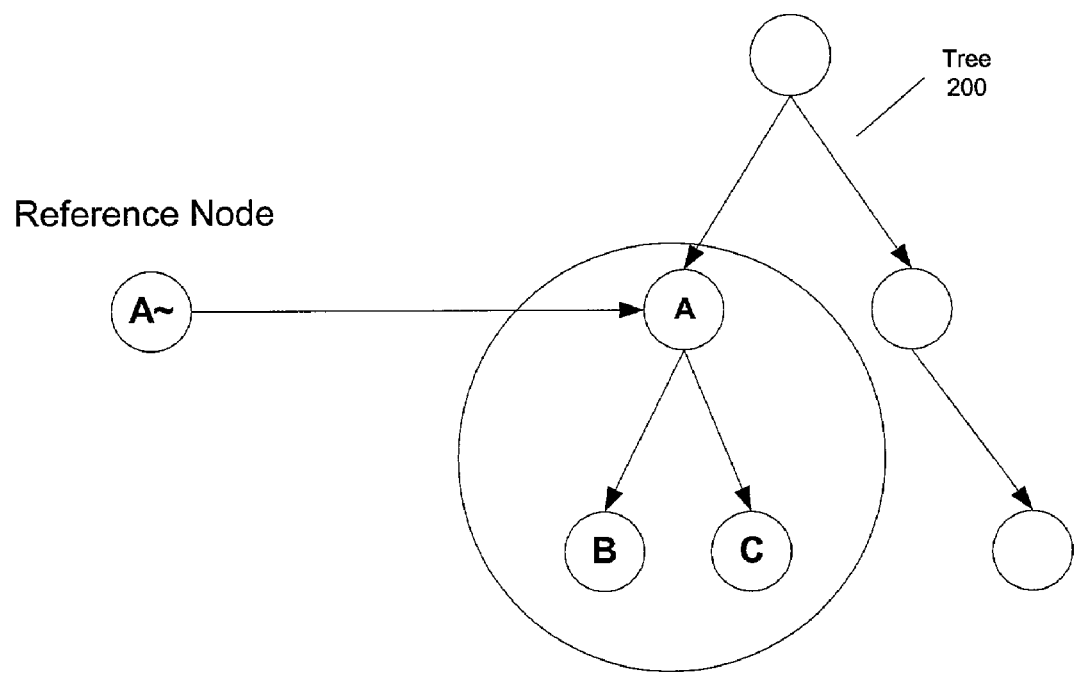
FIG. 2 is a diagram showing the use of a reference node according to an embodiment of the present invention.

FIG. 2 shows the use of a reference node according to one embodiment of the present invention. Tree 200 is a hierarchically organized tree, such as a DOM tree. Node A has two children B and C. Reference node A~is used only as a reference to the actual node A (and its children B and C) in memory. Reference node A~is used to indicate that node A is a winning node when a merged tree is created without having to clone tree 200 and paying the associated cost in time and memory consumption.

Figure 3:
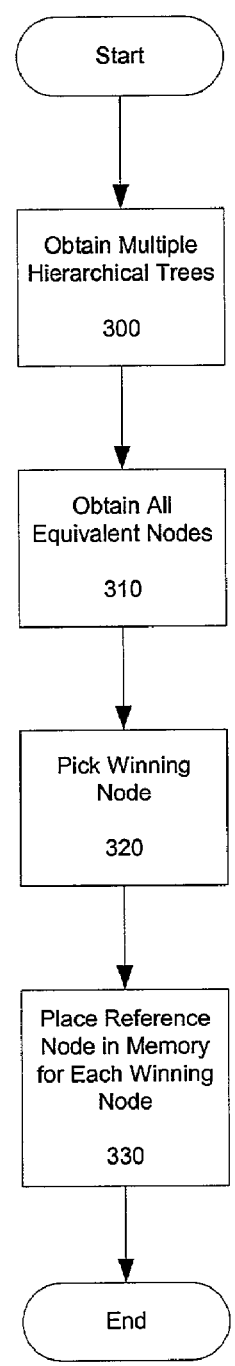
FIG. 3 is a flowchart showing the use of a reference node according to an embodiment of the present invention.

FIG. 3 is a flowchart showing how reference nodes are used according to an embodiment of the present invention. At box 300 multiple hierarchical trees are obtained. At box 310 all equivalent nodes in the trees are obtained, and winning nodes are selected at box 320. At box 330 a reference node is placed in memory for each winning node wherein the reference node refers to the data node.

Embodiment of an XML Merging System

Figure 4:
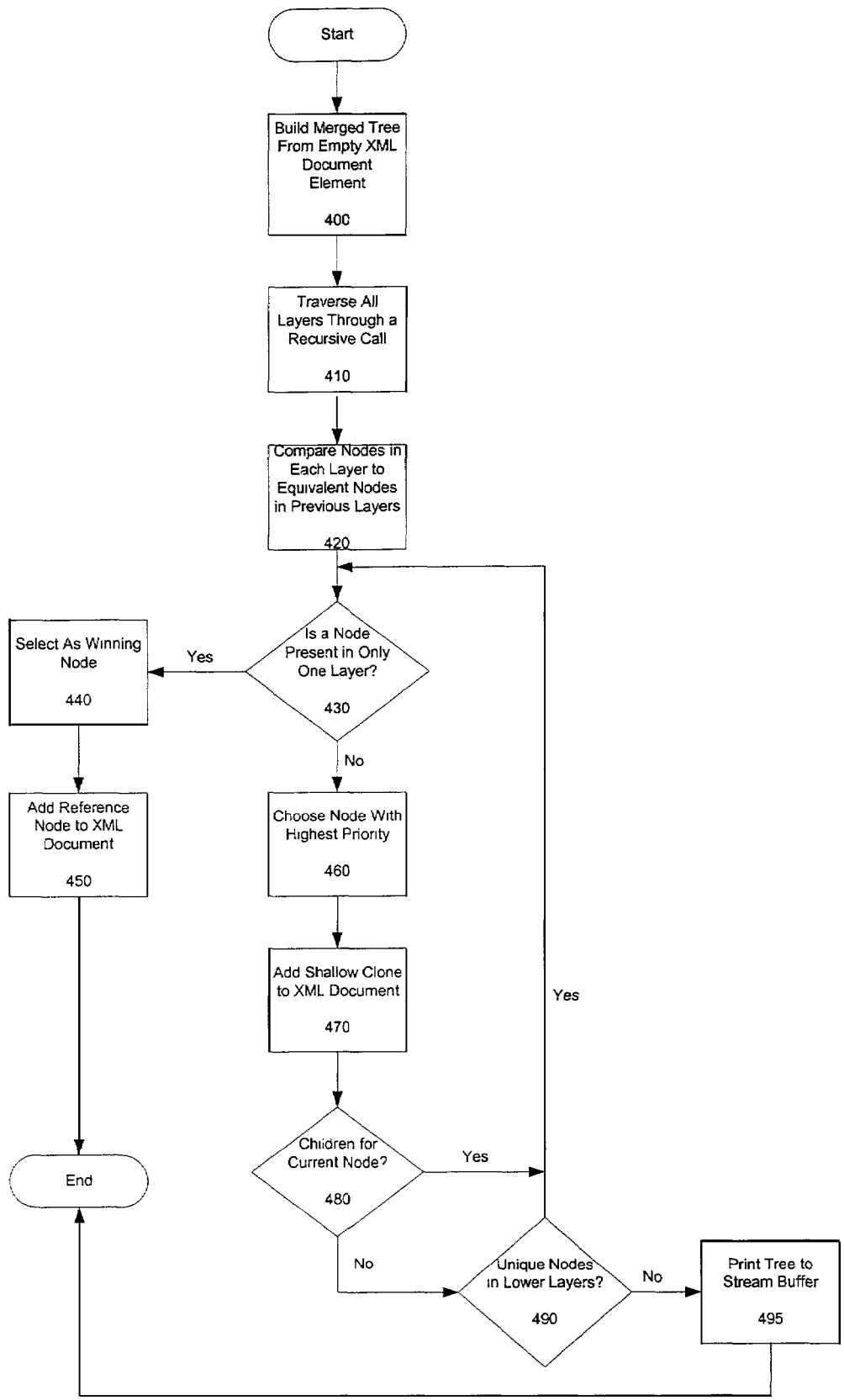
FIG. 4 is a flowchart showing the use of an XML merge system according to an embodiment of the present invention.

In one embodiment, the merging system is configured to operate on XML data. This embodiment is shown in FIG. 4. At box 400, a merged tree is first built from an empty XML document element. At box 410, all of the layers of the merged tree are traversed through a recursive call. At box 420, the nodes in each layer are compared to the equivalent nodes in the previous layers. In one embodiment, the layers are traversed starting with the highest priority layer down. Within each layer, nodes are visited a descendant level at a time.

At box 430, it is determined if a node is present only in one layer. If so, this node is selected as the winning node at box 440 and a reference node is created for that particular node and added to the temporary XML document, which represents the merged tree at box 450. If, on the other hand, at box 430, a node is present in at least two layers, the winning node is selected as the node in the highest priority layer at box 460.

A shallow clone (a copy of just the root node of the subtree and its attributes, but not including any children) of the node in the highest priority layer is made and added to the temporary XML document at box 470. Shallow clones, as opposed to full (or deep) clone nodes are relatively inexpensive and reduce the amount of copying needed. At this point, only a shallow clone is part of the winning node because the children may still be present in more than one layer, so at box 480, it is determined if there are children for the current node. If so, the process repeats at box 430.

If there are no more children at box 480, then the layer is completely traversed, and at box 490 it is determined if there are unique nodes in the lower layers. If so, box 430 repeats. Otherwise, the traversal of all the trees is completed. At this point, the temporary XML document contains a list of nodes and reference nodes, which comprise the merged tree. The tree is now outputted to a stream (StringBuffer) at box 495. At this point, when the output method identifies a reference node, the actual contents of the node (with all its children) are retrieved from the reference and outputted to the stream buffer. This ensures the contents of such a node are visited once, and only once.

Clone

The XML language is structured as a tree, which makes editing of the tree easy and efficient. For example, in order to edit a portion of the tree, a copy or clone of the pertinent portion is made first. This clone is completely detached from the original portion. In other words, any edits made to this clone are not reflected in the original portion. This security feature allows a user the ability to clone a portion of his/her tree to another user who can make edits to the loaned portioned without affecting the original portion. This clone comes in two varieties, a shallow clone and a deep clone.

A shallow clone of a tree is a copy of only the first layer of the tree, while a deep clone is a copy of the entire tree, which may have several layers. Embodiments of the present invention eliminate the use of deep cloning, which is not only an expensive operation, but uses computer memory wastefully. The shallow clone, like the wrapper or reference nodes is light weight (uses memory sparingly).

Case Study

Embodiments of the present invention include an enterprise where desktop applications are accessed via a computer network. For simplicity, the users in the organization may have their data divided into three layers; namely a user layer, a group layer, and an administrative layer (admin). The group layer defines the set of data that is common to all users in the same group (for example, an engineering group or a human resources group). Administrators keep data that are common to the organization or all the groups in the organization. If the user of a group would like to fetch the preference data that pertains to any office application, the information is distributed in three layers, each represented as a DOM tree in memory.

Nodes (carrying preference data) in the user layer have precedence over the group layer and the group layer has precedence over the administrative layer. So, if the same node is present in the user and group layer, the winning node is picked from the user layer. Similarly, if the node is present in the group and the admin layer, it is picked from the group layer, etc.

Though an organization can have as many layers as possible, the following seven cases uniquely identifies the conditional blocks in one embodiment of an iterative merge system working on three layers (User, Group, Admin)

Case 1: XML node present in all the three layers (A,G,U).
Case 2: XML node present in User and Group (U,G) layers and not present in Admin layer.
Case 3: XML node present in Group and Admin (G,A) layers and not present in User layer.
Case 4: XML node present in User and Admin (U,A) layers and not present in Group layer.
Case 5: XML node present in User (U) only and not present in Admin and Group layers.
Case 6: XML node present in Admin (A) only and not present in User and Group layers.
Case 7: XML node present in Group (G) only and not present in Admin and User layers.

Figure 5:
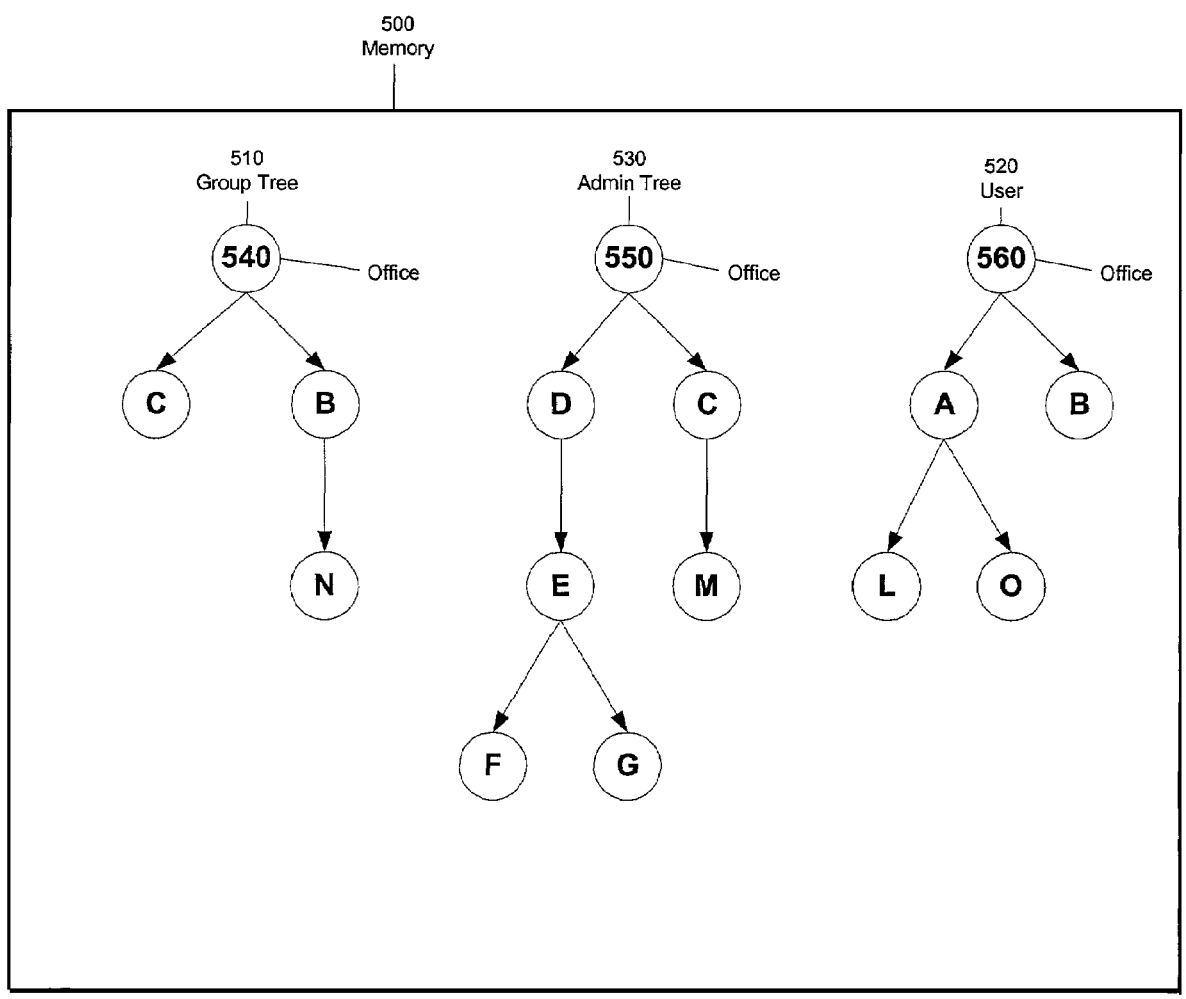
FIG. 5 is a diagram of three example trees in memory.

FIG. 5 shows the three trees in memory. Memory 500 contains group tree 510, user tree 520, and admin tree 530. Each tree is hierarchical and contains several hierarchical nodes. Group tree 510 includes a root 540 called office and children C and B. Node B is a parent of child N. Admin tree 530 includes a root 550, which has children D and C. Node C is a parent of node M. Node D is a parent of node E, which is a parent of nodes F and G. User tree 520 includes a root 560, termed office, and children A and B. Node A has children L and O. Note that if B were a parent of node P (not shown) in the User tree of FIG. 5, then in the merged tree (Office) of FIG. 6, node B would be a parent of both node N and node P (not shown).

Steps in Executing the Runtime Merge System

To achieve a merged tree from the trees in FIG. 5, one embodiment of the present invention operates as follows.

Iteration 1: An XML Document element is created with no leaf nodes attached to it. This temporary document is used to create the merged tree.

Iteration 2: Node "A" is not present in any preceding layers. So a reference node from "A" is created (a node that holds reference to the actual data) and added to the merged tree under "Office".

Iteration 3: Node "B" is present in both Group and User and so a shallow copy of just "B" is made from the user layer and added to the merged tree under "Office".

Iteration 4: Node "C" is present in both Group and Admin, so a shallow copy of just "C" is made from the group layer and added to the merged tree under "Office".

Iteration 5: Node "D"is only present in admin and so a reference for this node is created and added to the merged tree under "Office".

Iteration 6: The child under "B" is present only in the Group layer, so a reference node is made of the leaf node, "N", in the Group layer and added to the merged tree under "Office/B".

Iteration 7: The child under "C" is present only in the Admin layer. So a reference is made of the leaf node, "M", from the Admin layer and added to the merged tree under "Office/C".

Iteration 8. Now that the merged tree is created, a recursive print function iterates through the whole merged tree built out of references, and prints the nodes to a stream. One difference with this print function and a standard print function in the parser is that the enhanced print function understands the concept of reference nodes. Once the enhanced print function hits a reference node, it knows how to extract the actual element node in the reference and call its "print" function.

Figure 6:
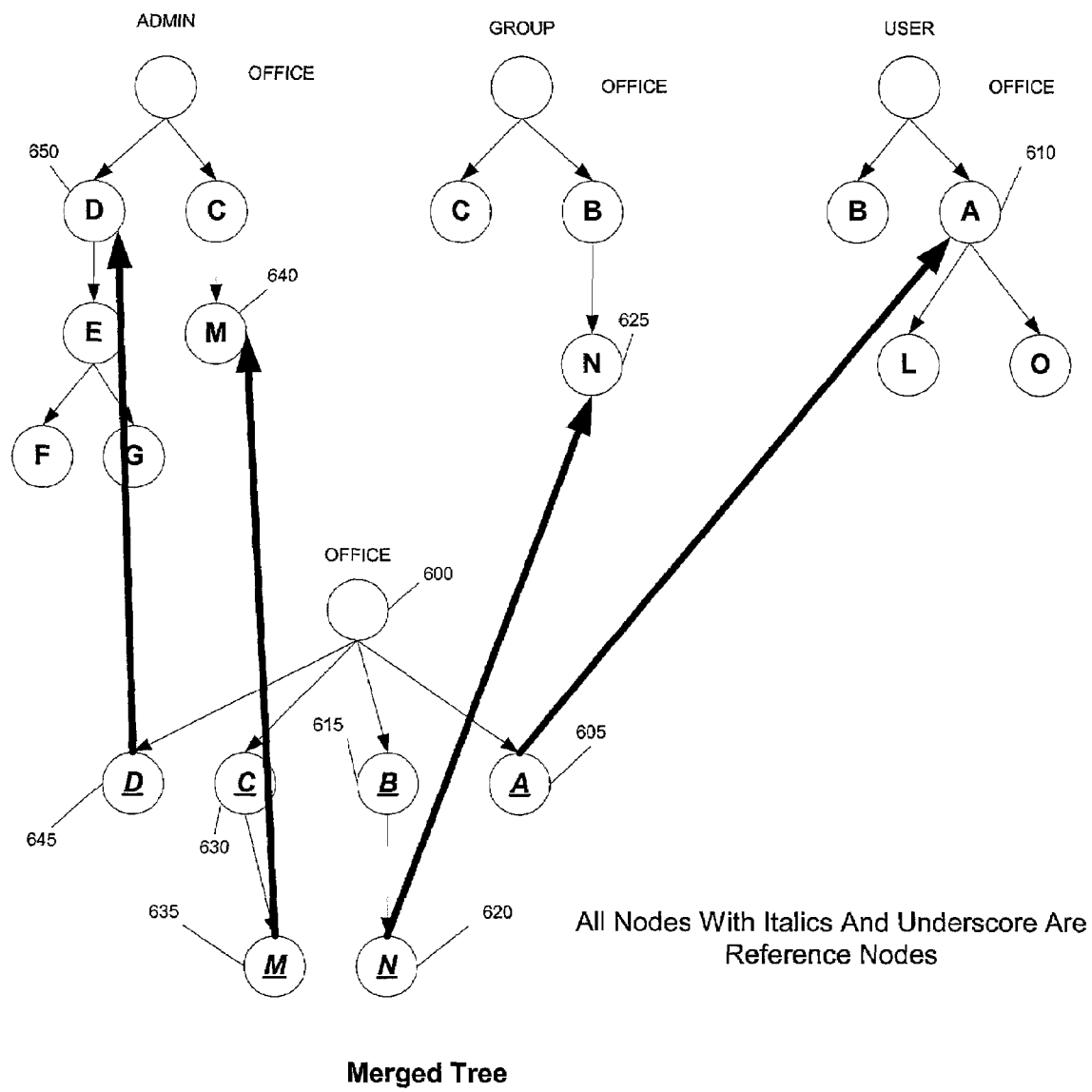
FIG. 6 shows a merged tree from three example trees according to an embodiment of the present invention.

In one embodiment, the whole mechanism is based on object oriented programming and so each type of node in the tree will do its work to print itself to the stream. FIG. 6 shows the merged tree and what nodes in the merged tree refer to the actual nodes in the DOM tree. FIG. 6 comes as a result of iterations 1 through 8 above. It includes a root 600, reference node A 605 which refers to node A 610; shallow clone node B 615; reference node N 620 which refers to data node N 625; shallow clone node C 630; reference node M 635 which refers to data node M 640; and reference node D 645 which refers to data node D 650.

The system of various embodiments of the present invention eliminates the use of cloning nodes and introduces a new concept of reference nodes that helps documents (e.g., XML documents) to be merged at runtime. The data structure required for the temporary merged tree is minimized because the data structure contains just two entities, reference or wrapper nodes, and shallow clones. Both entities use memory sparingly, thus saving the copying of the same data in multiple places. For example, laboratory experiments of a merged tree formed from 40 Kbytes of data obtained from an Admin tree and 30 Kbytes of data obtained from a User tree occupied approximately 50 bytes of memory space. In prior art, the merged tree would have been almost the same size (70 Kbytes) as the combined data size of the Admin and User trees, but using embodiments of the present invention this size is substantially reduced because of the use of shallow clones and reference nodes.

The new runtime merge system increases the speed of merging XML data at runtime. In one embodiment, speed is increased by approximately five times over prior art methods. Embodiments of the present invention also reduce a bottleneck of performance (the use of cloneNode( ) to replicate information for XML nodes), improves the response time for clients to fetch preference data, merges data effectively, introduces the use of reference nodes in XML to eliminate the copying of data, and considerably reduces the size of the intermediate data structures that need to be allocated for merging XML documents. In one embodiment, the invention is used to merge data of approximately 30 Kb in Admin tree, 5 Kb in Group tree, and 3 Kb in User tree in approximately 25 to 30 milliseconds.

Embodiment of Computer Execution Environment (Hardware)

Figure 7:
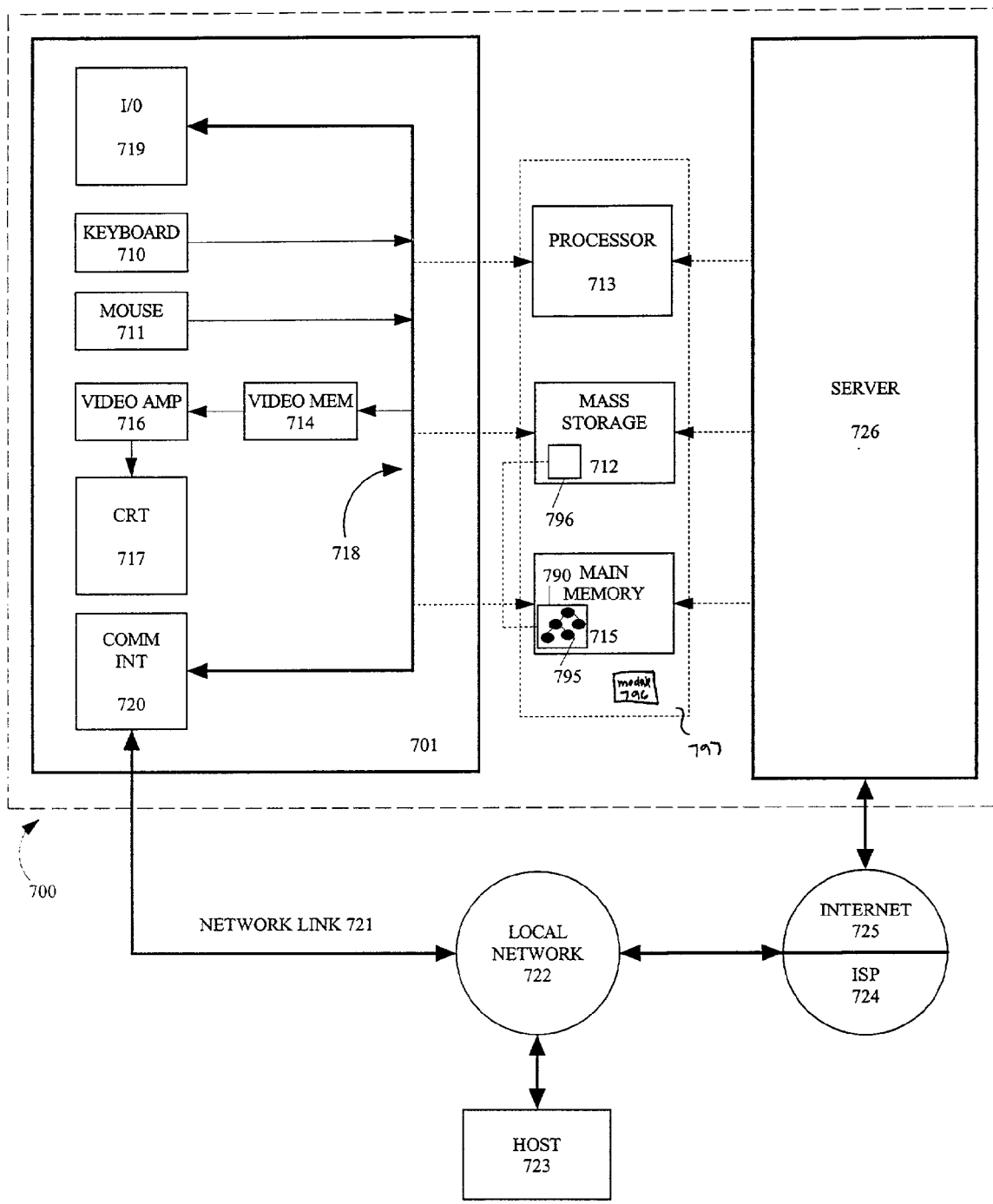
FIG. 7 shows an embodiment of a computer execution environment.

An embodiment of the invention can be implemented as computer software in the form of computer readable program code executed in a general purpose computing environment such as environment 700 illustrated in FIG. 7, or in the form of bytecode class files executable within a Java™ run time environment, or in the form of bytecodes running on a processor (or devices enabled to process bytecodes) existing in a distributed environment (e.g., one or more processors on a network). A keyboard 710 and mouse 711 are coupled to a system bus 718. The keyboard and mouse are for introducing user input to the computer system and communicating that user input to central processing unit (CPU) 713. Other suitable input devices maybe used in addition to, or in place of, the mouse 711 and keyboard 710. I/O (input/output) unit 719 coupled to bi-directional system bus 718 represents such I/O elements as a printer, A/V (audio/video) I/O, etc.

Computer 701 may include a communication interface 720 coupled to bus 718. Communication interface 720 provides a two-way data communication coupling via a network link 721 to a local network 722. For example, if communication interface 720 is an integrated services digital network (ISDN) card or a modem, communication interface 720 provides a data communication connection to the corresponding type of telephone line, which comprises part of network link 721. If communication interface 720 is a local area network (LAN) card, communication interface 720 provides a data communication connection via network link 721 to a compatible LAN. Wireless links are also possible. In any such implementation, communication interface 720 sends and receives electrical, electromagnetic or optical signals which carry digital data streams representing various types of information.

Network link 721 typically provides data communication through one or more networks to other data devices. For example, network link 721 may provide a connection through local network 722 to host computer 723 or to data equipment operated by ISP 724. ISP 724 in turn provides data communication services through the world wide packet data communication network now commonly referred to as "Internet" 725. Local network 722 and Internet 725 both use electrical, electromagnetic or optical signals which carry digital data streams. The signals through the various networks and the signals on network link 721 and through communication interface 720, which carry the digital data to and from computer 700, are exemplary forms of carrier waves transporting the information.

Processor 713 may reside wholly on client computer 701 or wholly on server 726 or processor 713 may have its computational power distributed between computer 701 and server 726. Server 726 symbolically is represented in FIG. 7 as one unit, but server 726 can also be distributed between multiple "tiers". In one embodiment, server 726 comprises a middle and back tier where application logic executes in the middle tier and persistent data is obtained in the back tier. In the case where processor 713 resides wholly on server 726, the results of the computations performed by processor 713 are transmitted to computer 701 via Internet 725, Internet Service Provider (ISP) 724, local network 722 and communication interface 720. In this way, computer 701 is able to display the results of the computation to a user in the form of output.

Computer 701 includes a video memory 714, main memory 715 and mass storage 712, all coupled to bi-directional system bus 718 along with keyboard 710, mouse 711 and processor 713.

As with processor 713, in various computing environments, main memory 715 and mass storage 712, can reside wholly on server 726 or computer 701, or they may be distributed between the two. Examples of systems where processor 713, main memory 715, and mass storage 712 are distributed between computer 701 and server 726 include the thin-client computing architecture developed by Sun Microsystems, Inc., the palm pilot computing device and other personal digital assistants, Internet ready cellular phones and other Internet computing devices, and in platform independent computing environments, such as those which utilize the Java technologies also developed by Sun Microsystems, Inc. XML DOM trees and identifiers for the nodes in the DOM trees 795 may be stored in main memory 715 with a cache 790. Objects removed from the cache may be stored in an area 796 of mass storage 712. Module 796 for merging the hierarchical trees and printing them also resides in tier 797. Module 796 is also used for examining the nodes in the hierarchical trees, determining if there are equivalent nodes, picking winning nodes, and storing references to the winning nodes.

The mass storage 712 may include both fixed and removable media, such as magnetic, optical or magnetic optical storage systems, or any other available mass storage technology. Bus 718 may contain, for example, thirty-two address lines for addressing video memory 714 or main memory 715. The system bus 718 also includes, for example, a 32-bit data bus for transferring data between and among the components, such as processor 713, main memory 715, video memory 714 and mass storage 712. Alternatively, multiplex data/address lines maybe used instead of separate data and address lines.

In one embodiment of the invention, the processor 713 is a microprocessor manufactured by Motorola, such as the 680X0 processor or a microprocessor manufactured by Intel, such as the 80X86, or Pentium processor, or a SPARC microprocessor from Sun Microsystems, Inc. However, any other suitable microprocessor or microcomputer may be utilized. Main memory 715 is comprised of dynamic random access memory (DRAM). Video memory 714 is a dual-ported video random access memory. One port of the video memory 714 is coupled to video amplifier 716. The video amplifier 716 is used to drive the cathode ray tube (CRT) raster monitor 717. Video amplifier 716 is well known in the art and may be implemented by any suitable apparatus. This circuitry converts pixel data stored in video memory 714 to a raster signal suitable for use by monitor 717. Monitor 717 is a type of monitor suitable for displaying graphic images.

Computer 701 can send messages and receive data, including program code, through the network(s), network link 721, and communication interface 720. In the Internet example, remote server computer 726 might transmit a requested code for an application program through Internet 725, ISP 724, local network 722 and communication interface 720. The received code may be executed by processor 713 as it is received, and/or stored in mass storage 712, or other non-volatile storage for later execution. In this manner, computer 700 may obtain application code in the form of a carrier wave. Alternatively, remote server computer 726 may execute applications using processor 713, and utilize mass storage 712, and/or video memory 715. The results of the execution at server 726 are then transmitted through Internet 725, ISP 724, local network 722 and communication interface 720. In this example, computer 701 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, servers on a network, and carrier waves.

The computer systems described above are for purposes of example only. An embodiment of the invention may be implemented in any type of computer system or programming or processing environment.

Thus, a method and apparatus for a runtime merging of hierarchical tree systems using a reference node implementation is described in conjunction with one or more specific embodiments. The invention is defined by the accompanying claims and their full scope of equivalents.

The invention claimed is:

1. A method in a data processing system comprising:
examining nodes in a plurality of hierarchical trees;
determining if a node is present in only one tree by comparing two or more of the hierarchical trees;
creating a merged tree based on the nodes in the hierarchical trees;
determining if the hierarchical trees comprise a set of equivalent nodes
selecting a node with the highest priority from the set of equivalent nodes if the hierarchical trees comprise a set of equivalent nodes;
creating a shallow clone of the selected node; and
adding the shallow clone to the merged tree.

2. The method of claim 1 further comprising:
creating a reference node to the node determined to be present in only one tree if a node is determined to be present in only one tree; and
adding the reference node to the merged tree.

3. The method of claim 2 wherein the reference node is a pointer.

4. The method of claim 2 wherein the reference node is a Java reference.

5. The method of claim 1 wherein the hierarchical trees comprise a group tree and a user tree.

6. The method of claim 1 wherein the hierarchical trees comprise a group tree and an admin tree.

7. The method of claim 1 wherein the hierarchical trees comprise a user tree and an admin tree.

8. The method of claim 1 wherein the hierarchical trees comprise a group tree, a user tree, and an admin tree.

9. The method of claim 1 wherein the hierarchical trees are DOM trees.

10. The method of claim 9 wherein the DOM trees are XML DOM trees.

11. The method of claim 1 further comprising:
printing the merged tree.

12. A data processing computer comprising:
a memory comprising a program that:
examines nodes in a plurality of hierarchical trees;
determines if a node is present in only one tree by comparing two or more of the hierarchical trees;
creates a merged tree based on the nodes in the hierarchical trees;
determines if the hierarchical trees comprise a set of equivalent nodes;
selects a node with the highest priority from the set of equivalent nodes if the hierarchical trees comprise a set of equivalent nodes;
creates a shallow clone of the selected node; and
adds the shallow clone to the merged tree; and
a processor for running the program.

13. The data processing computer of claim 12 wherein the program further:
creates a reference node to the node determined to be present in only one tree if a node is determined to be present in only one tree; and
adds the reference node to the merged tree.

14. The data processing computer of claim 13 wherein the reference node is a pointer.

15. The data processing computer of claim 13 wherein the reference node is a Java reference.

16. The data processing computer of claim 12 wherein the hierarchical trees comprise a group tree and a user tree.

17. The data processing computer of claim 12 wherein the hierarchical trees comprise a group tree and an admin tree.

18. The data processing computer of claim 12 wherein the hierarchical trees comprise a user tree and an admin tree.

19. The data processing computer of claim 12 wherein the hierarchical trees comprise a group tree, a user tree, and an admin tree.

20. The data processing computer of claim 12 wherein the hierarchical trees are DOM trees.

21. The data processing computer of claim 20 wherein the DOM trees are XML DOM trees.

22. The data processing computer of claim 12 wherein the program further:
prints the merged tree.

23. A computer-readable medium storing computer-readable instructions for controlling a data processing system to perform a method comprising the steps of:
examining nodes in a plurality of hierarchical trees;
determining if a node is present in only one tree by comparing two or more of the hierarchical trees; and
creating a merged tree based on the nodes in the hierarchical trees;
determining if the hierarchical trees comprise a set of equivalent nodes;
selecting a node with the highest priority from the set of equivalent nodes if the hierarchical trees comprise a set of equivalent nodes;
creating a shallow clone of the selected node; and
adding the shallow clone to the merged tree.

24. The computer-readable medium of claim 23 wherein the method further comprises the steps of:
creating a reference node to the node determined to be present in only one tree if a node is determined to be present in only one tree; and
adding the reference node to the merged tree.

25. The computer-readable medium of claim 24 wherein the reference node is a pointer.

26. The computer-readable medium of claim 24 wherein the reference node is a Java reference.

27. The computer-readable medium of claim 23 wherein the hierarchical trees comprise a group tree and a user tree.

28. The computer-readable medium of claim 23 wherein the hierarchical trees comprise a group tree and an admin tree.

29. The computer-readable medium of claim 23 wherein the hierarchical trees comprise a user tree and an admin tree.

30. The computer-readable medium of claim 23 wherein the hierarchical trees comprise a group tree, a user tree, and an admin tree.

31. The computer-readable medium of claim 23 wherein the hierarchical trees are DOM trees.

32. The computer-readable medium of claim 31 wherein the DOM trees are XML DOM trees.

33. The computer-readable medium of claim 23 wherein the method further comprises the step of:
printing the merged tree.

* * * * *